United States Patent
Husband et al.

(10) Patent No.: US 11,041,441 B2
(45) Date of Patent: Jun. 22, 2021

(54) METHODS AND APPARATUS FOR CONTROLLING AT LEAST A PART OF A START-UP OR RE-LIGHT PROCESS OF A GAS TURBINE ENGINE

(71) Applicant: ROLLS-ROYCE plc, London (GB)

(72) Inventors: Stephen M. Husband, Derby (GB); Ahmed My Razak, Bristol (GB)

(73) Assignee: Rolls-Royce plc

( * ) Notice: Subject to any disclaimer, the term of this patent is extended or adjusted under 35 U.S.C. 154(b) by 239 days.

(21) Appl. No.: 16/269,814

(22) Filed: Feb. 7, 2019

(65) Prior Publication Data
US 2019/0264615 A1 Aug. 29, 2019

(30) Foreign Application Priority Data
Feb. 26, 2018 (GB) ..................................... 1803038

(51) Int. Cl.
| | |
|---|---|
| *F02C 7/26* | (2006.01) |
| *F01D 19/00* | (2006.01) |
| *F02C 7/275* | (2006.01) |
| *F02C 7/262* | (2006.01) |
| *F02C 9/20* | (2006.01) |

(52) U.S. Cl.
CPC ................ *F02C 7/26* (2013.01); *F01D 19/00* (2013.01); *F02C 7/262* (2013.01); *F02C 7/275* (2013.01); *F02C 9/20* (2013.01); *F05D 2220/76* (2013.01); *F05D 2260/85* (2013.01); *F05D 2270/101* (2013.01); *F05D 2270/304* (2013.01)

(58) Field of Classification Search
CPC .. F01D 19/00; F01D 25/36; F02C 7/26; F02C 7/262; F02C 7/275; F02C 9/20; F04D 27/0207
See application file for complete search history.

(56) References Cited

U.S. PATENT DOCUMENTS

| | | | |
|---|---|---|---|
| 5,114,103 A | 5/1992 | Coffinberry | |
| 6,035,626 A | 3/2000 | Wahl et al. | |
| 6,231,306 B1 * | 5/2001 | Khalid | F01D 17/08 |
| | | | 415/118 |

(Continued)

FOREIGN PATENT DOCUMENTS

| | | |
|---|---|---|
| EP | 1619370 A1 | 1/2006 |
| EP | 1908941 A2 | 4/2008 |

(Continued)

OTHER PUBLICATIONS

Extended European Search Report dated Jul. 10, 2019 and issued in connection with European Patent Appln. No. 19154197.8.
Extended European Search Report dated Oct. 2, 2019 and issued in connection with European Patent Appln. No. 19154199.4.

(Continued)

*Primary Examiner* — Gerald L Sung
*Assistant Examiner* — Rene D Ford
(74) *Attorney, Agent, or Firm* — Barnes & Thornburg LLP

(57) ABSTRACT

A method of controlling at least a part of a start-up or re-light process of a gas turbine engine, the method comprising: controlling rotation of a low pressure compressor using a first electrical machine to increase angular velocity of the low pressure compressor; and controlling rotation of a high pressure compressor using a second electrical machine to restrict angular velocity of the high pressure compressor while the angular velocity of the low pressure compressor is increased.

19 Claims, 3 Drawing Sheets

(56) References Cited

U.S. PATENT DOCUMENTS

| | | | |
|---|---|---|---|
| 7,926,287 B2* | 4/2011 | Ullyott | F01D 21/06 60/776 |
| 2005/0056021 A1 | 3/2005 | Belokon et al. | |
| 2006/0042252 A1 | 3/2006 | Derouineau | |
| 2007/0151258 A1 | 7/2007 | Gaines | |
| 2007/0245709 A1* | 10/2007 | Dooley | F02C 7/32 60/226.1 |
| 2008/0072568 A1* | 3/2008 | Moniz | F01D 25/34 60/226.1 |
| 2012/0000204 A1 | 1/2012 | Kesseli et al. | |
| 2012/0015776 A1* | 1/2012 | Lemmers, Jr. | F02C 7/36 475/271 |
| 2013/0183136 A1 | 7/2013 | Roberge et al. | |
| 2013/0192195 A1 | 8/2013 | Wehmeier | |
| 2016/0195025 A1 | 7/2016 | Ajami et al. | |
| 2017/0218975 A1* | 8/2017 | Bintz | F02K 1/72 |

FOREIGN PATENT DOCUMENTS

| | | |
|---|---|---|
| EP | 3219964 A1 | 9/2017 |
| WO | 9502120 | 1/1995 |

OTHER PUBLICATIONS

Extended EP Search Report completed Apr. 8, 2020 and issued in connection with EP Patent Appln. No. 19207987.9, 5 pages.

Extended EP Search Report completed Apr. 8, 2020 and issued in connection with EP Patent Appln. No. 19207992.9, 5 pages.

Extended EP Search Report completed Apr. 9, 2020 and issued in connection with EP Patent Appln. No. 19207994.5, 8 pages.

Great Britain search report dated Aug. 14, 2018, issued in GB Patent Application No. 1803038.7.

Great Britain search report dated Aug. 23, 2018, issued in GB Patent Application No. 1803039.5.

* cited by examiner

METHODS AND APPARATUS FOR CONTROLLING AT LEAST A PART OF A START-UP OR RE-LIGHT PROCESS OF A GAS TURBINE ENGINE

CROSS-REFERENCE TO RELATED APPLICATIONS

This application is based upon and claims the benefit of priority from UK Patent Application Number 1803038.7, filed on 26 Feb. 2018, the entire contents of which are incorporated herein by reference.

BACKGROUND

Technical Field

The present disclosure concerns methods and apparatus for controlling at least a part of a start-up or re-light process of a gas turbine engine.

Description of the Related Art

Gas turbine engines usually have a start-up or re-light process in which the angular velocity of a high pressure compressor is increased prior to ignition within the combustion equipment of the gas turbine engine. At low speeds, the high pressure compressor may experience a disturbance known as a 'front end stall'. If the front end stall degenerates into a single cell rotating stall, the start-up or re-light process may be delayed, or may have to be aborted.

To prevent 'front end stall' of the high pressure compressor, a start bleed in the high pressure compressor may be used to exhaust air from the high pressure compressor, thereby enabling higher flow at the front stages of the high pressure compressor whilst preventing choking at the rear stages of the high pressure compressor. However, the start bleed may increase the noise output of the gas turbine engine during the start-up or re-light process, and may add weight to the gas turbine engine, reducing brake specific fuel consumption.

SUMMARY

According to a first aspect there is provided a method of controlling at least a part of a start-up or re-light process of a gas turbine engine, the method comprising: controlling rotation of a low pressure compressor using a first electrical machine to increase angular velocity of the low pressure compressor; and controlling rotation of a high pressure compressor using a second electrical machine to restrict angular velocity of the high pressure compressor while the angular velocity of the low pressure compressor is increased.

The method may further comprise: controlling opening of a plurality of variable vanes of the high pressure compressor.

The method may further comprise: controlling closing of one of more bleed ports of the high pressure compressor.

The method may further comprise: determining if an exit pressure of the low pressure compressor is equal to or greater than a threshold exit pressure; and controlling rotation of the high pressure compressor using the second electrical machine to increase angular velocity of the high pressure compressor if the exit pressure is equal to or greater than the threshold exit pressure.

The method may further comprise: controlling ignition within a combustion chamber of the gas turbine engine.

The method may further comprise: controlling the first electrical machine and the second electrical machine to function as electrical generators, subsequent to controlling ignition within the combustion chamber of the gas turbine engine.

The method may further comprise: controlling movement of a variable pitch fan of the gas turbine engine to an idle position.

The method may further comprise: controlling a clutch of a gear box of the gas turbine engine to disengage power transmission from a turbine section of the gas turbine engine to a fan of the gas turbine engine.

The method may further comprise: controlling restriction of airflow through a bypass duct of the gas turbine engine.

According to a second aspect there is provided a computer program that, when read by a computer, causes performance of the method as described in the preceding paragraphs.

According to a third aspect there is provided a non-transitory computer readable storage medium comprising computer readable instructions that, when read by a computer, cause performance of the method as described in the preceding paragraphs.

According to a fourth aspect there is provided a signal comprising computer readable instructions that, when read by a computer, cause performance of the method as described in the preceding paragraphs.

According to a fifth aspect there is provided apparatus for controlling at least a part of a start-up or re-light process of a gas turbine engine, the apparatus comprising a controller configured to: control rotation of a low pressure compressor using a first electrical machine to increase angular velocity of the low pressure compressor; and control rotation of a high pressure compressor using a second electrical machine to restrict angular velocity of the high pressure compressor while the angular velocity of the low pressure compressor is increased.

The controller may be configured to: control opening of a plurality of variable vanes of the high pressure compressor.

The controller may be configured to: control closing of one of more bleed ports of the high pressure compressor.

The controller may be configured to: determine if an exit pressure of the low pressure compressor is equal to or greater than a threshold exit pressure; and control rotation of the high pressure compressor using the second electrical machine to increase angular velocity of the high pressure compressor if the exit pressure is equal to or greater than the threshold exit pressure.

The controller may be configured to: control ignition within a combustion chamber of the gas turbine engine.

The controller may be configured to: control the first electrical machine and the second electrical machine to function as electrical generators, subsequent to controlling ignition within the combustion chamber of the gas turbine engine.

The controller may be configured to: control movement of a variable pitch fan of the gas turbine engine to an idle position.

The controller may be configured to: control a clutch of a gear box of the gas turbine engine to disengage power transmission from a turbine section of the gas turbine engine to a fan of the gas turbine engine.

The controller may be configured to: control restriction of airflow through a bypass duct of the gas turbine engine.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
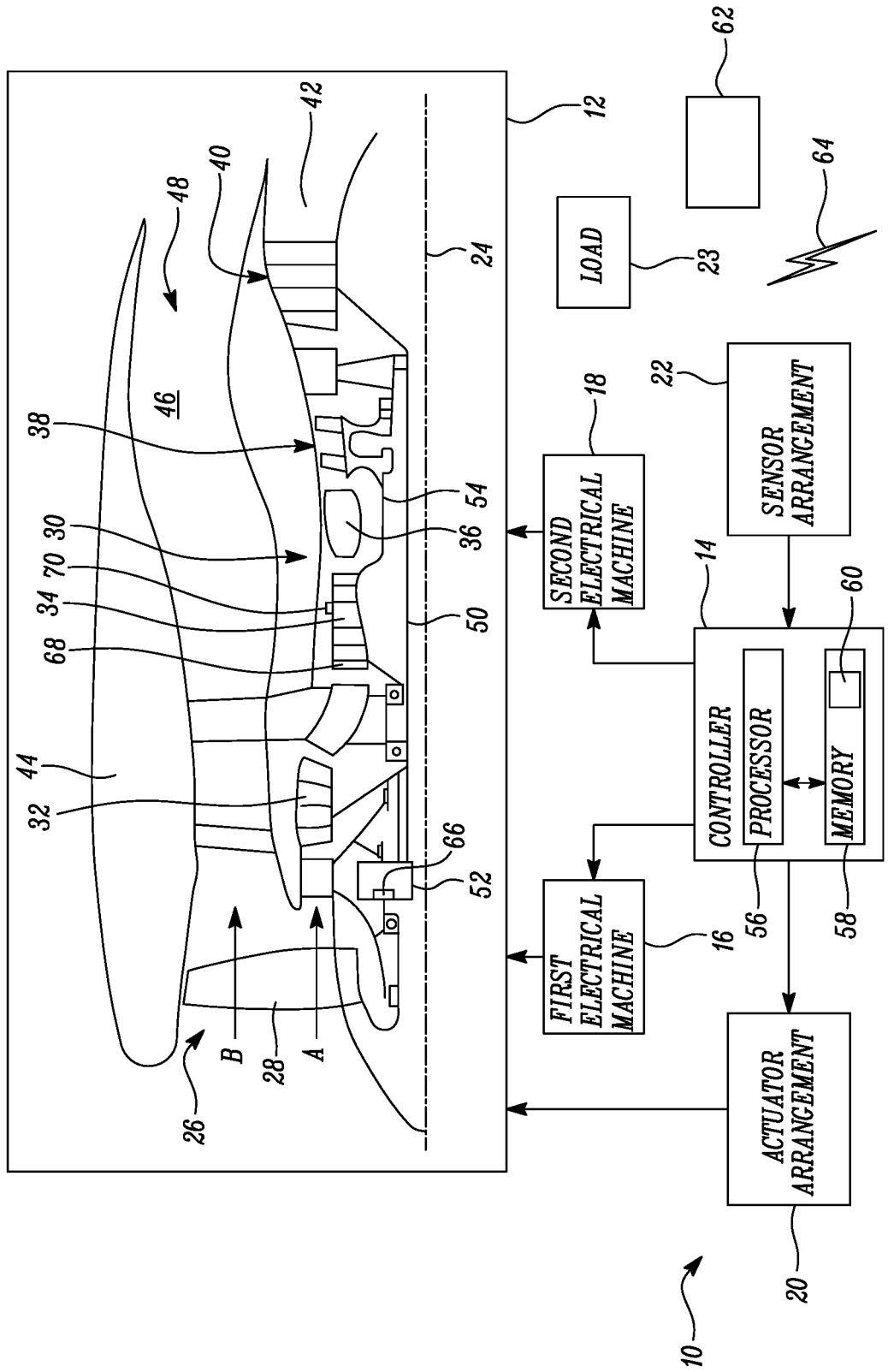
FIG. 1 illustrates a schematic diagram of apparatus for controlling at least a part of a start-up or re-light process of a gas turbine engine according to various examples.

FIG. 1 illustrates apparatus 10 for controlling at least a part of a start-up or re-light process of a gas turbine engine 12 according to various examples. The apparatus 10 includes a controller 14, a first electrical machine 16, a second electrical machine 18, an actuator arrangement 20, a sensor arrangement 22, and a load 23.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 14, and the remaining features (such as the first electrical machine 16, the second electrical machine 18, the actuator arrangement 20, the sensor arrangement 22, and the load 23) may be added by another manufacturer, or by an end user.

FIG. 1 also illustrates a cross sectional view of an upper half of the gas turbine engine 12. The gas turbine engine 12 has a principal rotational axis 24 and comprises an air intake 26 and a propulsive fan 28 that generates two airflows, A and B. The gas turbine engine 12 comprises a core engine 30 having, in axial flow A, a low pressure compressor 32, a high pressure compressor 34, combustion equipment 36, a high pressure turbine 38, a low pressure turbine 40, and a core exhaust nozzle 42. A nacelle 44 surrounds the gas turbine engine 12 and defines, in axial flow B, a bypass duct 46 and a bypass exhaust nozzle 48. The fan 28 is attached to and driven by the low pressure turbine 40 via a shaft 50 and epicyclic gearbox 52.

In operation, air in the core airflow A is accelerated and compressed by the low pressure compressor 32 and directed into the high pressure compressor 34 where further compression takes place. The compressed air exhausted from the high pressure compressor 34 is directed into the combustion equipment 36 where it is mixed with fuel and the mixture is combusted. The resultant hot combustion products then expand through, and thereby drive the high pressure and low pressure turbines 38, 40 before being exhausted through the nozzle 42 to provide propulsive thrust. The high pressure turbine 38 drives the high pressure compressor 34 via a shaft 54. The fan 28 provides the majority of the propulsive thrust.

The epicyclic gearbox 52 is a reduction gearbox and enables the fan 28 to rotate at a lower rotational speed than the low pressure turbine 40.

Additionally or alternatively, the gearbox 52 may drive additional and/or alternative components (e.g. the low pressure compressor and/or a booster compressor, or a propeller (aero or hydro)). In some examples, the gearbox 52 may drive an electrical generator instead of the fan 28, and may be a speed increasing gearbox.

Additionally or alternatively such engines may have an alternative number of compressors and/or turbines and/or an alternative number of interconnecting shafts. In some examples, the gas turbine engine 12 may not comprise the gearbox 52 and may instead comprise direct drive between the low pressure turbine 40 and the fan 28.

The controller 14, the first electrical machine 16, the second electrical machine 18, the actuator arrangement 20, and the sensor arrangement 22 may be coupled to one another via a wireless link and may comprise transceiver circuitry and one or more antennas. Additionally or alternatively, the controller 14, the first electrical machine 16, the second electrical machine 18, the actuator arrangement 20, and the sensor arrangement 22 may be coupled to one another via a wired link and may comprise connectors (such as a Universal Serial Bus (USB) socket). It should be appreciated that the controller 14, the first electrical machine 16, the second electrical machine 18, the actuator arrangement 20, and the sensor arrangement 22 may be coupled to one another via any combination of wired and wireless links.

Figure 2:
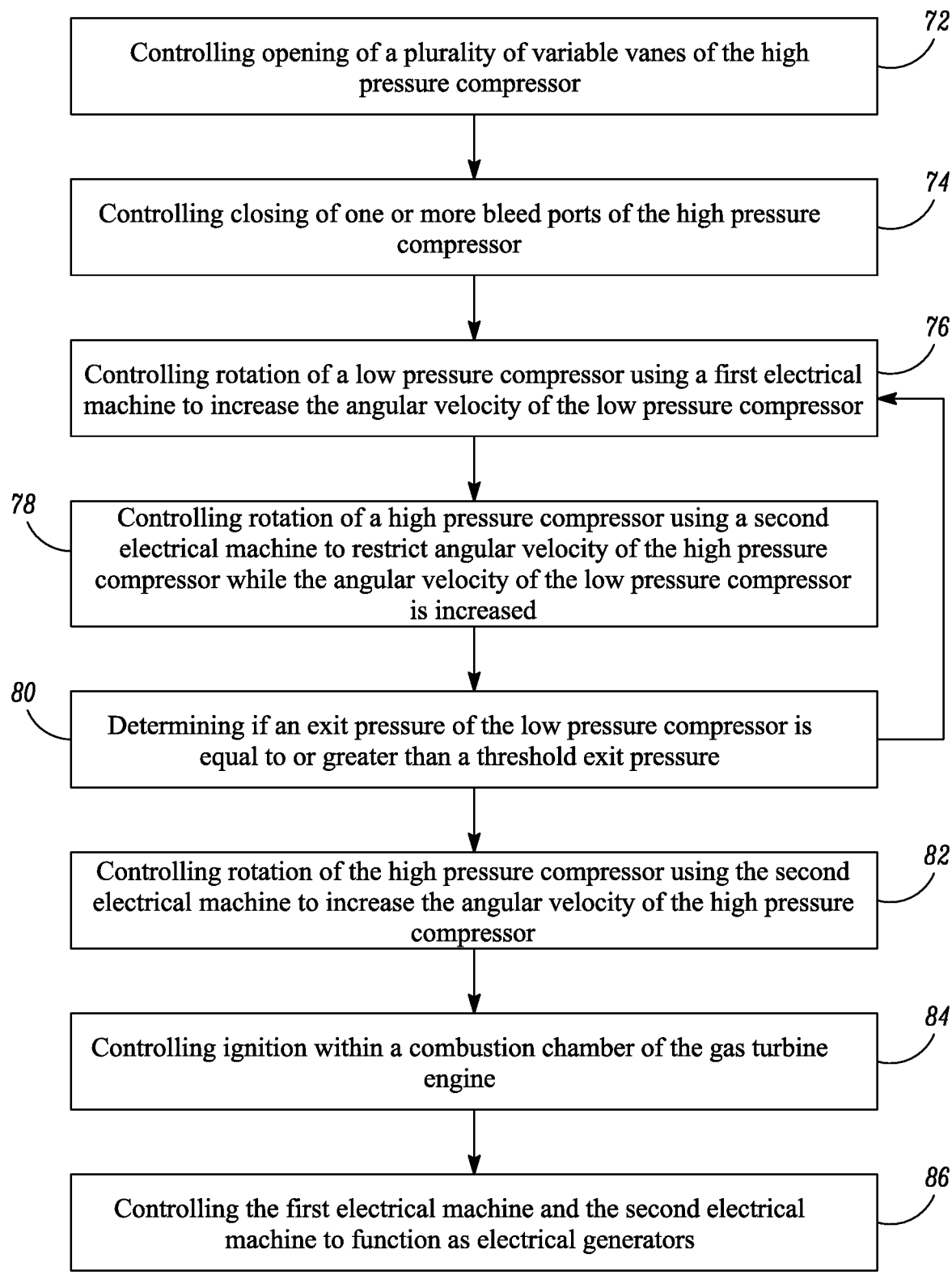
FIG. 2 illustrates a flow diagram of a method of controlling at least a part of a start-up or re-light process of a gas turbine engine according to a first example.
Figure 3:
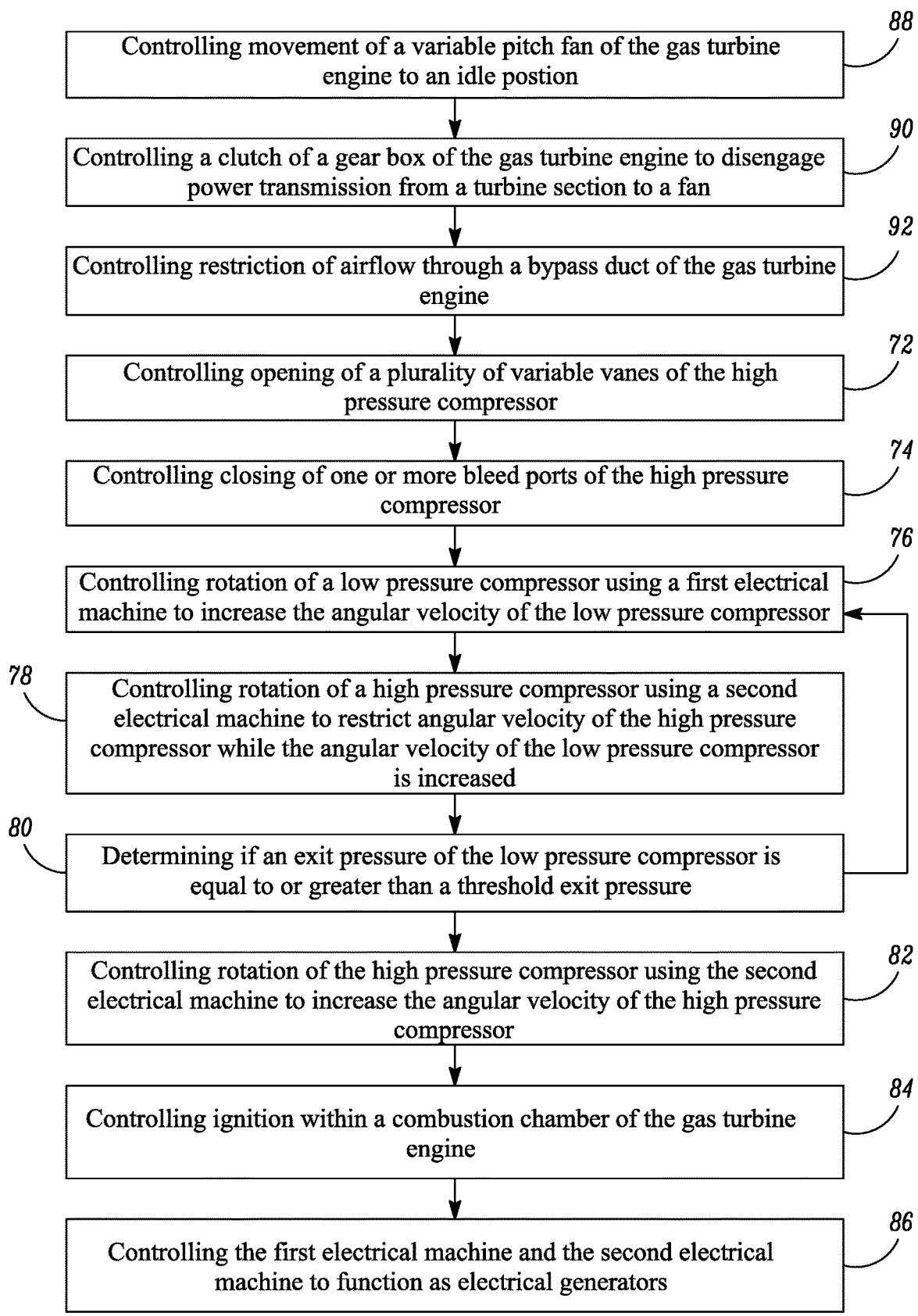
FIG. 3 illustrates a flow diagram of a method of controlling at least a part of a start-up or re-light process of a gas turbine engine according to a second example.

The controller 14 may comprise any suitable circuitry to cause performance of the methods described herein and as illustrated in FIGS. 2 and 3. The controller 14 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods. In some examples, the controller 14 may be a Full Authority Digital Engine Controller (FADEC), an electronic engine controller (EEC) or an engine control unit (ECU).

In various examples, the controller 14 may comprise at least one processor 56 and at least one memory 58. The memory 58 stores a computer program 60 comprising computer readable instructions that, when read by the processor 56, causes performance of the methods described herein, and as illustrated in FIGS. 2 and 3. The computer program 60 may be software or firmware, or may be a combination of software and firmware.

The processor 56 may be located on the gas turbine engine 12, or may be located remote from the gas turbine engine 12, or may be distributed between the gas turbine engine 12 and a location remote from the gas turbine engine 12. The processor 56 may include at least one microprocessor and may comprise a single core processor, may comprise multiple processor cores (such as a dual core processor or a quad core processor), or may comprise a plurality of processors (at least one of which may comprise multiple processor cores).

The memory 58 may be located on the gas turbine engine 12, or may be located remote from the gas turbine engine 12, or may be distributed between the gas turbine engine 12 and a location remote from the gas turbine engine 12. The memory 58 may be any suitable non-transitory computer readable storage medium, data storage device or devices, and may comprise a hard disk and/or solid state memory (such as flash memory). The memory 58 may be permanent non-removable memory, or may be removable memory (such as a universal serial bus (USB) flash drive or a secure digital card). The memory 58 may include: local memory employed during actual execution of the computer program; bulk storage; and cache memories which provide temporary storage of at least some computer readable or computer usable program code to reduce the number of times code may be retrieved from bulk storage during execution of the code.

The computer program 60 may be stored on a non-transitory computer readable storage medium 62. The computer program 60 may be transferred from the non-transitory computer readable storage medium 62 to the memory 58. The non-transitory computer readable storage medium 60 may be, for example, a USB flash drive, a secure digital (SD) card, an optical disk (such as a compact disc (CD), a digital versatile disc (DVD) or a Blu-ray disc). In some examples, the computer program 60 may be transferred to the memory 58 via a signal 64 (such as a wireless signal or a wired signal).

Input/output devices may be coupled to the controller 14 either directly or through intervening input/output controllers. Various communication adaptors may also be coupled to the controller 14 to enable the apparatus 10 to become coupled to other apparatus or remote printers or storage devices through intervening private or public networks. Non-limiting examples include modems and network adaptors of such communication adaptors.

The first electrical machine 16 is configured to control the angular velocity of the low pressure compressor 32. The first electrical machine 16 may be mounted directly on the shaft 50 (for example, a rotor of the first electrical machine 16 may be fastened to, and abut the shaft 50). Alternatively, the first electrical machine 16 may be mounted at a location remote from the shaft 50 (such as on a core casing, or on a fan casing) and may be coupled to the shaft 50 via gearing and one or more further shafts. Alternatively, the shaft 50 may include a portion that forms the rotor of the first electrical machine 16 (that is, the rotor of the first electrical machine 16 may be integral with and a part of the shaft 50).

The controller 14 is configured to control the operation of the first electrical machine 16. For example, the controller 14 may control the supply of electrical power to the first electrical machine 16 to cause the first electrical machine 16 to function as an electrical motor. By way of another example, the controller 14 may connect the first electrical machine 16 to the load 66 to enable the first electrical machine 16 to function as an electrical generator.

The second electrical machine 18 is configured to control the angular velocity of the high pressure compressor 34. The second electrical machine 18 may be mounted directly on the shaft 54 (for example, a rotor of the second electrical machine 18 may be fastened to, and abut the shaft 54). Alternatively, the second electrical machine 18 may be mounted at a location remote from the shaft 54 (such as on a core casing, or on a fan casing) and coupled to the shaft 54 via gearing and one or more further shafts. Alternatively, the shaft 54 may include a portion that forms the rotor of the second electrical machine 18 (that is, the rotor of the second electrical machine 18 may be integral with and a part of the shaft 54).

The controller 14 is configured to control the operation of the second electrical machine 18. For example, the controller 14 may control the supply of electrical power to the second electrical machine 18 to cause the second electrical machine 18 to function as an electrical motor. By way of another example, the controller 14 may connect the second electrical machine 18 to a load to enable the second electrical machine 18 to function as an electrical generator.

The actuator arrangement 20 may comprise any suitable actuator or actuators for enabling control of at least a part of the gas turbine engine 12. For example, the actuator arrangement 20 may comprise one or more servo motors and/or one or more solenoid valves. The controller 14 is configured to control the operation of the actuator arrangement 20.

For example, where the fan 28 is a variable pitch fan, the actuator arrangement 20 may include a servo motor for varying the pitch of the fan (for example, between an idle position and an operational position). In another example, where the gearbox 52 includes a clutch 66, the actuator arrangement 20 may include a servo motor for moving the clutch 66 between a first position that connects the fan 28 to the low pressure turbine 40, and a second position that disconnects the fan 28 from the low pressure turbine 40. In a further example, the actuator arrangement 20 may include a servo motor for moving a member (such as a vane) to restrict airflow B through the bypass duct 46. In another example, the actuator arrangement 20 may include a servo motor for moving a plurality of vanes 68 within the high pressure compressor 34 between an open position and a closed position. In a further example, the actuator arrangement 20 may include one or more solenoid valves for opening and closing one or more bleed ports 70 of the high pressure compressor 34.

The sensor arrangement 22 may include any suitable sensor or sensors for sensing one or more properties of the gas turbine engine 12. For example, the sensor arrangement 22 may include a first sensor for sensing the angular velocity of the low pressure compressor 32 and a second sensor for sensing the angular velocity of the high pressure compressor 34. The controller 14 is configured to receive data from the sensor arrangement 22.

The load 23 may comprise an electrical network that is configured to use and/or store electrical power generated by at least the second electrical machine 18. For example, the load 23 may include an electrical energy storage device (such as a battery or a supercapacitor) that is configured to store electrical energy generated by at least the second electrical machine 18. By way of another example, the load 23 may alternatively or additionally comprise one or more electronic devices that operate using the electrical power supplied from at least the second electrical machine 18.

FIG. 2 illustrates a flow diagram of a method of controlling at least a part of a start-up or re-light process of a gas turbine engine according to a first example.

At block 72, the method may include controlling opening of a plurality of variable vanes 68 of the high pressure compressor 34. For example, the controller 14 may control the actuator arrangement 20 to open a plurality of variable inlet guide vanes (VIGVs) and/or a plurality of variable stator vanes (VSVs) of the high pressure compressor 34.

At block 74, the method may include controlling closing one or more bleed ports 70 of the high pressure compressor 34. For example, the controller 14 may control the actuator arrangement 34 to close one or more of the bleed ports 70 of the high pressure compressor 34.

At block 76, the method includes controlling rotation of the low pressure compressor 32 using the first electrical machine 16 to increase the angular velocity of the low pressure compressor 32. For example, the controller 14 may control the supply of electrical power to the first electrical machine 16 to enable the first electrical machine 16 to function as an electrical motor to increase the angular velocity of the low pressure compressor 32 (in other words, the controller 14 controls the first electrical machine 16 to drive the low pressure compressor 32 to accelerate the low pressure compressor 32). In operation, the rotation of the low pressure compressor 32 increases the pressure at the entrance of the high pressure compressor 34 to a pressure above ambient pressure.

At block 78, the method includes controlling rotation of the high pressure compressor 34 using the second electrical machine 18 to restrict the angular velocity of the high pressure compressor 34 while the angular velocity of the low pressure compressor 32 is being increased by the first electrical machine 16. For example, the controller 14 may connect the second electrical machine 18 to the load 23 to enable the second electrical machine 18 to function as an electrical generator and thus extract energy from the high pressure compressor 34. By way of another example, the controller 14 may connect the output from the second electrical machine 18 to the input of the first electrical machine 16 to enable the second electrical machine 18 to function as an electrical generator and provide electrical power to the first electrical machine 16 to drive the low pressure compressor 32. In some examples, the controller 14 may control the angular acceleration of the high pressure compressor 34 so that the angular velocity of the high pressure compressor 34 does not exceed a threshold velocity.

It should be appreciated that in some examples, blocks 76 and 78 may be performed simultaneously. In other examples, block 78 may be initiated prior to the initiation of block 76 (that is, the second electrical machine 18 may be connected to the load 23 or to the first electrical machine 32 prior to the first electrical machine 16 accelerating the low pressure compressor 32).

At block 80, the method may include determining if an exit pressure of the low pressure compressor 32 is greater than or equal to a threshold exit pressure. For example, the controller 14 may receive torque and angular velocity measurements of the low pressure compressor 32 and the high pressure compressor 34 from the sensor arrangement 22 and determine the exit pressure of the low pressure compressor 32 using the received measurements. In another example, the controller 14 may receive pressure data from a pressure sensor positioned at the exit of the low pressure compressor 32, and then determine whether the measured pressure is equal to or greater than the threshold exit pressure. In a further example, the sensor arrangement 22 may not be required for the performance of block 80 since the controller 14 may determine the torque and angular velocity of the low pressure compressor 32 and the high pressure compressor 34 from the control data for the first and second electrical machines 16, 18. In particular, the speed of the first electrical machine 16 and the second electrical machine 18 is directly related to the electrical frequency, and the torque is related to the electrical current, and the power to the current and voltage product. The determined exit pressure may be compared with a threshold exit pressure stored in the memory 58.

If the determined exit pressure is not equal to or greater than the threshold exit pressure, the method returns to block 76.

If the determined exit pressure is equal to or greater than the threshold exit pressure, the method moves to block 82.

At block 82, the method may include controlling rotation of the high pressure compressor 34 using the second electrical machine 18 to increase the angular velocity of the high pressure compressor 34. For example, the controller 14 may control the supply of electrical power to the second electrical machine 18 to enable the second electrical machine 18 to function as an electrical motor to increase the angular velocity of the high pressure compressor 34.

At block 84, the method may include controlling ignition within a combustion chamber of the gas turbine engine 12. For example, the controller 14 may control a fuel pump to pump fuel to the combustion equipment 36, and may control the supply of electrical power to igniters in the combustion equipment 36 to ignite the fuel.

At block 86, the method may include controlling the first electrical machine 16 and the second electrical machine 18 to function as electrical generators. For example, the controller 14 may connect the first electrical machine 16 and the second electrical machine 18 to the load 23 to enable the first electrical machine 16 and the second electrical machine 18 to supply electrical power to the load 23.

The apparatus 10 and the methods described above may provide several advantages.

First, the driving of the low pressure compressor 32 and the restriction of the high pressure compressor 34 by the first and second electrical machines 16, 18 at blocks 76 and 78 respectively may reduce the impact of induced drag in the high pressure compressor 34 and may thus prevent the downstream stages of the high pressure compressor 34 from choking, and the upstream stages of the high pressure compressor 34 from stalling and surging. This may enable the use of the start bleed of the gas turbine engine 12 to be minimized or eliminated. In some examples, the use of the apparatus 10 and the methods described above may enable the manufacture of a gas turbine engine comprising a high pressure compressor without a start bleed.

Second, the opening of the vanes 68 and the closing of the bleed ports 70 in the high pressure compressor 34 may assist in the increase of pressure at the exit of the low pressure compressor 34/the entrance to the high pressure compressor 34.

Third, the use of the first and second electrical machines 16, 18 as electrical generators may advantageously supply electrical power to the electrical network 23 during start-up of the gas turbine engine 12.

FIG. 3 illustrates a flow diagram of a method of controlling at least a part of a start-up or re-light process of a gas turbine engine according to a second example. The method illustrated in FIG. 3 is similar to the method illustrated in FIG. 2 and where the blocks are similar, the same reference numerals are used. The method illustrated in FIG. 3 differs from the method illustrated in FIG. 2 in that the method illustrated in FIG. 3 further comprises blocks 88, 90 and 92. It should be appreciated that blocks 88, 90 and 92 may be performed in any order and may be performed at any time prior to block 82.

At block 88, the method may include controlling movement of a variable pitch fan of the gas turbine engine to an idle position. For example, the controller 14 may control a servo motor of the actuator arrangement 20 to change the pitch of the fan 28 to an idle position.

At block 90, the method may include controlling a clutch of a gearbox of the gas turbine engine to disengage power transmission from a turbine section to a fan. For example, the controller 14 may control the clutch 66 to disengage the fan 28 from the low pressure turbine 40.

At block 92, the method may include controlling restriction of airflow through a bypass duct of the gas turbine engine. For example, the controller 14 may control the actuator arrangement 20 to move a member (such as a vane) to restrict the airflow B within the bypass duct 46 of the gas turbine engine 12.

The methods illustrated in FIG. 3 may be advantageous in that blocks 88, 90 and 92 may reduce aerodynamic drag on the low pressure compressor 32 and may thus assist with the increase in pressure at the exit of the low pressure compressor 32/the entrance to the high pressure compressor 34 during the start-up or the re-light process.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of controlling at least a part of a start-up or re-light process of a gas turbine engine, the method comprising:
   controlling rotation of a low pressure compressor using a first electrical machine to increase angular velocity of the low pressure compressor; and
   controlling rotation of a high pressure compressor using a second electrical machine to restrict angular velocity of the high pressure compressor while the angular velocity of the low pressure compressor is increased.

2. A method as claimed in claim 1, further comprising: controlling opening of a plurality of variable vanes of the high pressure compressor.

3. A method as claimed in claim 1, further comprising: controlling closing of one or more bleed ports of the high pressure compressor.

4. A method as claimed in claim 1, further comprising: determining if an exit pressure of the low pressure compressor is equal to or greater than a threshold exit pressure; and controlling rotation of the high pressure compressor using the second electrical machine to increase angular velocity of the high pressure compressor if the exit pressure is equal to or greater than the threshold exit pressure.

5. A method as claimed in claim 1, further comprising: controlling ignition within a combustion chamber of the gas turbine engine.

6. A method as claimed in claim 5, further comprising: controlling the first electrical machine and the second electrical machine to function as electrical generators, subsequent to controlling ignition within the combustion chamber of the gas turbine engine.

7. A method as claimed in claim 1, further comprising: controlling movement of a variable pitch fan of the gas turbine engine to an idle position.

8. A method as claimed in claim 1, further comprising: controlling a clutch of a gear box of the gas turbine engine to disengage power transmission from a turbine section of the gas turbine engine to a fan of the gas turbine engine.

9. A method as claimed in claim 1, further comprising: controlling restriction of airflow through a bypass duct of the gas turbine engine.

10. A non-transitory computer readable storage medium comprising computer readable instructions that, when read by a computer, cause performance of the method as claimed in claim 1.

11. Apparatus for controlling at least a part of a start-up or re-light process of a gas turbine engine, the apparatus comprising a computer programmed to:
    control rotation of a low pressure compressor using a first electrical machine to increase angular velocity of the low pressure compressor; and
    control rotation of a high pressure compressor using a second electrical machine to restrict angular velocity of the high pressure compressor while the angular velocity of the low pressure compressor is increased.

12. Apparatus as claimed in claim 11, wherein the computer is programmed to: control opening of a plurality of variable vanes of the high pressure compressor.

13. Apparatus as claimed in claim 11, wherein the computer is programmed to: control closing of one or more bleed ports of the high pressure compressor.

14. Apparatus as claimed in claim 11, wherein the computer is programmed to: determine if an exit pressure of the low pressure compressor is equal to or greater than a threshold exit pressure; and control rotation of the high pressure compressor using the second electrical machine to increase angular velocity of the high pressure compressor if the exit pressure is equal to or greater than the threshold exit pressure.

15. Apparatus as claimed in claim 11, wherein the computer is programmed to: control ignition within a combustion chamber of the gas turbine engine.

16. Apparatus as claimed in claim 15, wherein the computer is programmed to: control the first electrical machine and the second electrical machine to function as electrical generators, subsequent to controlling ignition within the combustion chamber of the gas turbine engine.

17. Apparatus as claimed in claim 11, wherein the computer is programmed to: control movement of a variable pitch fan of the gas turbine engine to an idle position.

18. Apparatus as claimed in claim 11, wherein the computer is programmed to: control a clutch of a gear box of the gas turbine engine to disengage power transmission from a turbine section of the gas turbine engine to a fan of the gas turbine engine.

19. Apparatus as claimed in claim 11, wherein the computer is programmed to: control restriction of airflow through a bypass duct of the gas turbine engine.

* * * * *